(12) United States Patent
Mensch

(10) Patent No.: US 6,276,520 B1
(45) Date of Patent: Aug. 21, 2001

(54) SIDE-BY-SIDE BELT CONVEYOR SYSTEM AND METHOD OF USE

(75) Inventor: William A. Mensch, Farmington, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 09/567,043

(22) Filed: May 8, 2000

Related U.S. Application Data

(62) Division of application No. 08/934,658, filed on Sep. 22, 1997.

(51) Int. Cl.$^7$ ............................. B65G 15/60; B65G 39/10
(52) U.S. Cl. ............................................. 198/839; 198/842
(58) Field of Search ................................... 198/837, 839, 198/842

(56) References Cited

U.S. PATENT DOCUMENTS

| | | | |
|---|---|---|---|
| 1,505,971 | 8/1924 | Rebstock | 198/842 |
| 2,784,834 | 3/1957 | Trinkle . | |
| 2,861,675 * | 11/1958 | Cordis | 198/839 |
| 2,979,187 | 4/1961 | Erickson . | |
| 3,179,238 | 4/1965 | Patin . | |
| 3,301,383 * | 1/1967 | Doyer | 198/837 |
| 3,637,090 | 1/1972 | Murphy et al. . | |
| 5,358,260 * | 10/1994 | Ogata et al. | 198/839 |
| 5,363,951 | 11/1994 | Mensch . | |

FOREIGN PATENT DOCUMENTS

| | | | |
|---|---|---|---|
| 641399 | 8/1928 | (FR) . | |
| 1258707 * | 3/1961 | (FR) | 198/839 |
| 1 566 085 | 5/1969 | (FR) . | |
| 2 491 898 | 4/1982 | (FR) . | |

\* cited by examiner

*Primary Examiner*—Christopher P. Ellis
*Assistant Examiner*—Mark A. Deuble
(74) *Attorney, Agent, or Firm*—Dickinson Wright PLLC

(57) ABSTRACT

A conveyor system comprises a pair of side-by-side conveyors adapted to move articles such as baggage or cargo in opposite directions simultaneously, preferably at the same elevation, and linked together by an endless belt. The endless belt is directed from the exit of one conveyor to the entrance of the other conveyor and from the exit of the other conveyor to the entrance of the one conveyor via a pair of conveyor twist assemblies which maintain the baggage carrying surface in an upward orientation on both conveyors. The twist assemblies can employ vertical or horizontal rolls to attain the direction change of the endless belt. Staggered idler rolls can be arranged beneath the two conveyors for belt support and reduction of vibration caused by belt travel. The side-by-side conveyor system is particularly useful in multiple stacked arrangements in tunnels for airports.

20 Claims, 3 Drawing Sheets

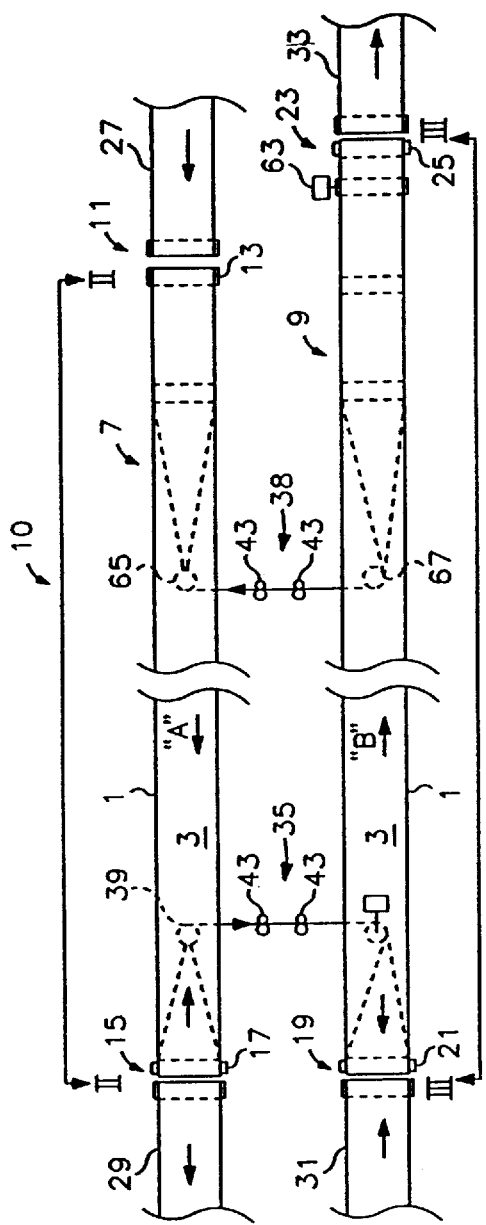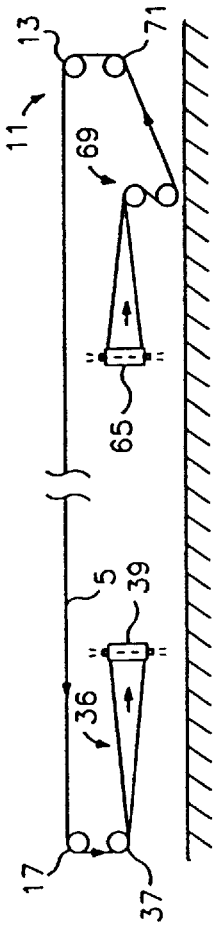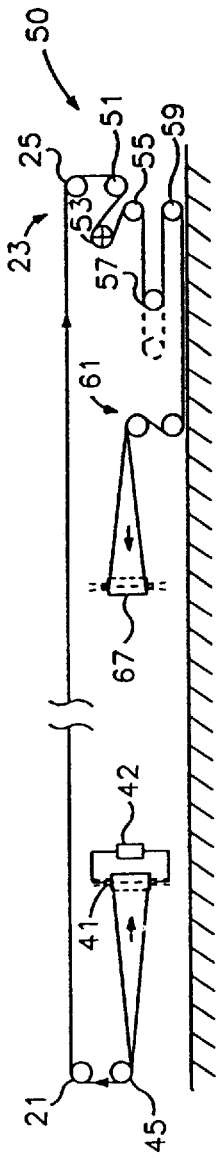

SIDE-BY-SIDE BELT CONVEYOR SYSTEM AND METHOD OF USE

This application is a Divisional of Ser. No. 08/934,658 filed Sep. 22, 1997.

FIELD OF THE INVENTION

The present invention is directed to a side-by-side belt conveyor system and its method of use, and in particular, to a compact side-by-side conveyor system which utilizes belt twist assemblies on opposite ends of the system to transport baggage in two different directions simultaneously.

BACKGROUND ART

In the prior art, the use of conveyors to transport cargo, bulk materials and the like are well known. One type of a conveyor system especially adapted for baggage such as that found in airports is an over-under belt conveyor system as disclosed in U.S. Pat. No. 5,363,951 to Mensch. This patent, incorporated in its entirety by reference herein, discloses a conveyor system which has upper and lower vertically spaced, oppositely moving load carrying runs, each having an entrance end and an exit end. The system is especially adapted for two-way conveyance of articles under varying load conditions in the handling of baggage at an airport.

Often times, a number of over-under conveyor systems or a plurality of single conveyors are arranged in tunnels in airports employing one or more intermediate terminals to accommodate increased baggage handling requirements. The over-under conveyor systems are more advantageous in terms of tunnel construction costs than a number of single conveyors since more conveyor runs can be fit into a given tunnel (the tunnel is not as wide as those using multiple single conveyors but has a slightly increased height).

With the need to further reduce construction costs, particularly for tunnel construction and the drawbacks of over-under conveyors (increased tunnel height), a need has developed to provide improved conveyor systems which offer equivalent baggage handling capability while reducing space requirements and tunnel construction costs.

The present invention solves this need by providing a side-by-side conveyor system which provides the same baggage carrying capacity as an over-under conveyor system in less space, thereby reducing tunnel construction costs. The present invention uses twisting roll assemblies to link an endless belt between oppositely moving baggage travel paths of carry and return conveyors while still maintaining the baggage carrying surface of the endless belt in the correct orientation.

The use of roll assemblies to rotate or twist endless belts has been proposed in the bulk material handling arts. U.S. Pat. Nos. 2,784,834 and 2,979,187 disclose a conveyor system which gives an endless belt a 180° twist at both the head and tail ends to keep the bottom or clean side of the belt against the return idlers. The 180° twist is attained by supporting the belt at each end of the twist with horizontal terminal rolls. This twisting subjects the belt to catenary deflection, edge elongation from belt sag and formation of a helical pattern at the belt edge. The 180° twist also does not subject the belt to gravity effects that may cause a loss of control of the belt during its travel.

The use of vertical rolls to twist an endless belt is disclosed in U.S. Pat. No. 3,637,090 to Murphy et al. The belt twisting is done to provide an improved belt storage system which permits rapid adjustment of the length of an active conveyor portion by removal of belt supporting sections mounted on skids from a storage portion to the active conveyor portion, and vice versa. With this adjustment, the length of the respective belt subsystems may be correspondingly adjusted as may be required in the field. The Murphy patent is adapted for use in the handling of bulk materials, e.g., mining operations or earth fill operations. Neither of these patents suggest a dual run conveyor system for baggage handling.

SUMMARY OF THE INVENTION

Accordingly, it is a first object of the present invention to provide a side-by-side belt conveyor system which transports baggage in two different directions simultaneously.

Another object of the present invention is to provide a side-by-side belt conveyor system having twist assemblies at opposite ends thereof to facilitate the different direction baggage transport.

A still further object of the present invention is a method of transporting baggage in two different directions using the inventive side-by-side conveyor system.

One other object of the present invention is to provide conveyor twist assemblies which employ vertical or horizontal rolls for conveyor twisting.

Yet another object of the invention is a conveyor system which transports baggage in two different directions at the same elevation.

Other objects and advantages of the present invention will become apparent as a description thereof proceeds.

In satisfaction of the foregoing objects and advantages, the present invention provides a side-by-side conveyor system comprising an endless belt having a baggage carrying surface and an opposing friction surface. The endless belt rests on a first conveyor support having a first entrance end and a first exit end that form therebetween a first baggage travel path or carry conveyor. The system also includes a second conveyor support for the endless belt having a second entrance end and a second exit end that form therebetween a second baggage travel path or return conveyor. A first conveyor twist assembly is positioned for directing the endless belt at the first exit end to the second entrance end and a second conveyor twist assembly is positioned for directing the endless belt at the second exit end to the first entrance end. Each conveyor twist assembly includes at least two twist rolls positioned to twist the endless belt so that the baggage carrying surface facing upwardly when traveling in one direction along the first baggage travel path remains upward when traveling in an opposite direction along the second baggage travel path. Other means for changing the direction of the endless belt from the first baggage travel path to the second baggage travel path while maintaining the baggage carrying surface in an upward orientation on both conveyors can be employed. For driving the endless belt along each baggage travel path, the system includes at least one conveyor drive assembly.

The side-by-side conveyor can be used as a stand alone system or it can be combined with feed and take away conveyors as part of a more comprehensive conveying system. The side-by-side conveyor system can also be vertically stacked into a plurality of systems to handle large volumes of baggage, for example, volumes found at airports, shipping distribution centers or the like.

The twist assemblies can utilize vertically or horizontally aligned rolls to change the endless belt travel direction and maintain the baggage carrying surface in an upward orientation from the carry conveyor to the return conveyor. When using vertically aligned rolls, it is preferred that the rolls be moveable with respect to the roll axis to help control travel of the belt when its sides are disposed vertically. More preferably, the rolls are tiltable about their roll axes. Vertically disposed bending rolls can be positioned between the two vertically aligned twisting rolls to assist travel of the endless belt during its vertical orientation.

When using horizontal rolls, the rolls are preferably tapered to achieve the belt twisting. Alternatively, hourglass-shaped rolls can be employed for belt twisting. In either case, the horizontal aligned rolls can be moveable in a horizontal plane for adjustment of tension.

The conveyor support can employ a support structure utilizing a series of staggered idler rolls for endless belt support along the travel paths of the carry and return conveyors and for reduction of belt vibration.

The invention also includes a method of transporting articles such as cargo, baggage, luggage or any other conveyable item that employs the inventive side-by-side conveyor by loading articles onto the carry conveyor entrance end and removing them from the exit end. Simultaneously if desired, the return conveyor receives baggage on its entrance end and conveys the articles to their exit end. The method can employ feed and take away conveyors in combination with the carry and return conveyors for further article handling.

BRIEF DESCRIPTION OF THE DRAWINGS

Reference is now made to the drawings of the invention wherein:

FIG. 1 is a schematic plan view of one embodiment of the inventive conveyor system;

FIG. 2 is an elevational view along the line II—II of FIG. 1;

FIG. 3 is an elevational view along the line III—III of FIG. 1;

DESCRIPTION OF THE PREFERRED EMBODIMENTS

Figure 4:
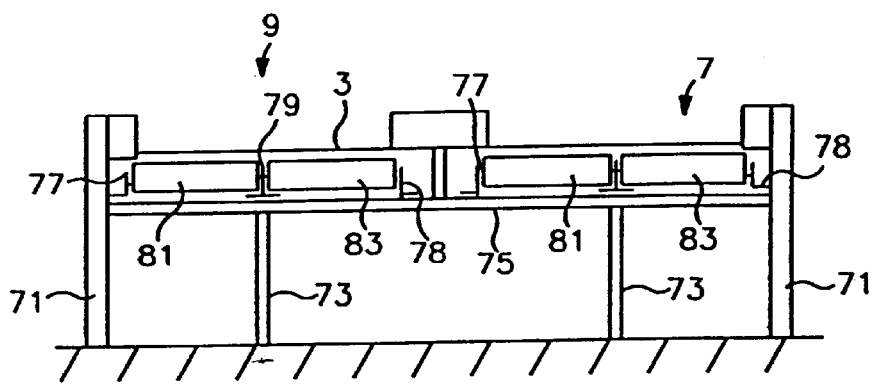
FIG. 4 is an end view of the conveyor system showing idler rolls and conveyor supports.

The inventive side-by-side conveyor system offers significant advantages over known conveyor systems for use in transporting baggage, cargo, articles or the like. Hereinafter, items considered to be conveyable by the inventive system are referred to as baggage. By using the side-by-side conveyors, equivalent baggage handling capability can be attained as if using over-under conveyors while, at the same time, occupying less cross-sectional area. This more compact design is economically beneficial when utilizing a number of side-by-side conveyor systems in a tunnel in an airport facility or the like.

One embodiment of the invention is depicted in FIGS. 1–3 and is designated as reference numeral 10. The side-by-side conveyor system 10 includes an endless belt 1 having a baggage carrying surface 3. The baggage carrying surface is one that facilitates the charging or discharging of baggage or the like to or from the conveyor. The baggage carrying surface 3 is generally a slick or slippery surface that facilitates baggage movement. The surface 3 can be integrally formed with the endless belt, can be in the form of a belt cover or can be any other type typically used in conveying baggage, cargo or luggage.

The underside of the belt 1, designated as reference numeral 5 in FIG. 2 is a friction-type surface such as rubber or the like. The underside surface 5 is the drive side of the endless belt 1, and therefore, is desired to have a coefficient of friction that permits use of lower slack side tension for transfer of the drive power to the belt 1. This difference in surfaces contrasts with bulk material handling conveyors, wherein both belt covers or surfaces are rubber so that their friction coefficient is used both for drive power transfer and adhesion of material to the belt 1 with minimal or no slippage.

The system 10 comprises a first or carry conveyor 7, hereinafter referred to as the carry conveyor, and a second conveyor 9, hereinafter referred to as the return conveyor. The carry conveyor 7 has an entrance end 11 with a terminal roll 13 and an exit end 15 with a terminal roll 17. Similarly, the return conveyor 9 has an entrance end 19 with a terminal roll 21 and an exit end 23 with a terminal roll 25.

The carry conveyor 7 is shown disposed between a feed run conveyor 27 and a takeaway conveyor 29. Similarly, the return conveyor 9 is disposed between a feed run conveyor 31 and a takeaway conveyor 33. The feed run conveyors 27 and 31 and the takeaway conveyors 29 and 33 are similar to those described in the Mensch patent referenced above except for a lack of a need for curved sections since the inventive conveyors are side-by-side rather than over and under. As disclosed in the Mensch patent, the feed and takeaway conveyors provide for in-line transfer of articles being conveyed to and from the carry and return conveyors of the inventive side-by-side conveyor 10. Typically, the feed and takeaway conveyors are acceleration and deceleration feeder conveyors using short, speed-up, individually built conveyors. The number of acceleration and deceleration conveyors may be dependent upon the speed of the side-by-side conveyor. The number of feeder conveyors, the speed step and the conveyor length is determined by the coefficient of friction between the feeder conveyor belt cover/surface and the baggage. Rubber covers are typically used on both sides of the belts used on the acceleration and deceleration feeder conveyors.

Of course, other means may be employed to feed or remove articles, cargo or baggage on the carry and return conveyors, 7 and 9, respectively. In addition, if so desired, the feed and takeaway could be supplied for only one conveyor such as the carry conveyor 7 rather than both.

The endless belt 1 is linked between the carry conveyor 7 and the return conveyor 9 by two belt twisting assemblies 35 and 38. The belt twisting assembly 35 links the exit end 15 of the carry conveyor 7 with the entrance end 19 of the return conveyor 9. The assembly 35 comprises a roll arrangement which directs and twists the endless belt 1 leaving the exit end 15 towards the entrance end 17 while still maintaining the baggage carrying surface 3 in an upward orientation.

In the embodiment depicted in FIGS. 1–3, the belt 1 leaving the exit end 15 is subjected to a first horizontal to vertical twist. The horizontal to vertical belt twist uses a horizontal roll 37 at the entrance to the twist area, see FIG. 2. Based upon the belt modulus of elasticity, weight, catenary tension, and the helical elongation of the belt edges, there must be tension at both edges of the belt 1. Tension is provided by an automatic gravity take-up device such as that disclosed in the Mensch patent. Since these devices are conventional, a further description thereof is not deemed necessary for understanding of the invention. If the tension should approach or be at zero at the center of the belt 1 in the catenary span 36, the upper edge of the belt 1 would go into compression and fold on itself. This would cause the belt 1 to misalign and drop, thereby causing a loss of belt control.

Following the 90° twist catenary 36 downstream of roll 37, a vertically displaced roll 39 is located. The roll 39 is essentially vertical but provisions are made to allow a small degree of vertical axis displacement control ability represented by displacement means 42, see FIG. 3. Vertical roll displacement may be required to provide a force vector in the vertical "up" direction to compensate for the belt gravity force. Belt weight and friction between the vertical belt 1 and roll 39 are all elements that keep the belt 1 from falling down off the roll 39. The roll 39 may be rubber lagged to assist in maintaining the belt 1 in its vertical direction. The tilting of the vertically aligned rolls to achieve the necessary force vector in the "up" direction can range from 0° to 20° as measured from vertical.

As the belt 1 bends 90° around the entry vertical roll 39, it travels to the exit vertical roll 41. The roll 41 is also preferably rubber lagged for enhanced friction between the belt 1 and the roll 41 to compensate for belt weight and gravity force. Vertical axis adjustment as described for the entrance roll is also used for the exit roll 41.

Between the entrance and exit vertical rolls 39 and 41, a set of two vertical rolls are placed on each side of the vertical belt 1, each set designated by the reference numeral 43. The rolls 43 lay on or contact the belt 1 and can be adjusted to bend the belt 1 from its vertical plane at the center between the entrance and exit rolls 39 and 41. The slight twist introduced at this point gives a small increase in wrap at the vertical roll 41 and an increase in the belt moment of inertia vertical axis. In other words, the rolls 43 stiffen the belt 1. Although a set of two roll pairs 43 are shown, a single pair or more than two pairs could be employed.

As the belt 1 passes through the stabilizer rolls 43 and enters the vertical exit roll, the belt 1 is twisted back to its correct horizontal configuration with the dissimilar belt surfaces in the correct attitude for conveying the baggage. The belt 1, now in its horizontal attitude, is fed onto the second baggage return run via roll 45 and entrance terminal roll 21.

At the other end of the conveyor system 10 are located the twist assembly 38 and a drive assembly 50. The drive assembly 50 includes a training roll 51, drive roll 53, idler roll 55, takeup roll 57 and idler roll 59. The drive roll 53 is connected to a drive represented by reference numeral 63, see FIG. 1. It should be understood that the drive assembly 50 is exemplary and other drive assemblies can be used for the inventive conveyor system. Further, the drives disclosed in the Mensch patent are also adaptable for the invention as is the use of multiple drives, multiple dynamic takeup rolls and belt storage takeups as also described in the Mensch patent.

The twist assembly 38 with vertically aligned rolls 65 and 67 is similar to the twist assembly 35 except that an idler roll pair 61 are disposed between the twist roll 67 and the drive assembly 50. Likewise, idler roll pair 69 are disposed between the twist roll 65 and the trailing roll 71 adjacent the entrance end 11 of the carry conveyor 7. As with the twisting assembly 35, a set of stabilizer roll pairs 43 are provided between the vertically aligned rolls 65 and 67 for the purposes described above.

It should be understood that the configurations of the vertically aligned rolls 39, 41, 65 and 67 are exemplary in FIGS. 1 and 3. Other configurations of the twist assemblies can be utilized such as those employing different sites and/or orientations with respect to the carry and return conveyors 7 and 9. For example, the twist assembly 38 and drive assembly 50 could be arranged so that the drive assembly would be interposed between the two twist assemblies rather than having the twist assembly 38 disposed between the twist assembly 35 and the drive assembly 50. Other configurations as would be within the skill of the art are also within the scope of the invention. Other means for changing the direction of the endless belt from the first baggage travel path to the second baggage travel path while maintaining the baggage carrying surface in an upward orientation on both conveyors can also be employed.

Preferably, the conveyor 7 and 9 are at the same elevation. This arrangement facilitates feeding and taking away of cargo or baggage from both the carry and return conveyors.

Figure 5:
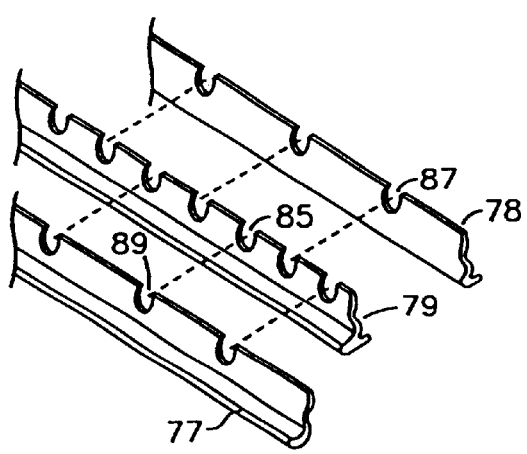
FIG. 5 is a perspective view of the idler roll supports of FIG. 4.
Figure 9:
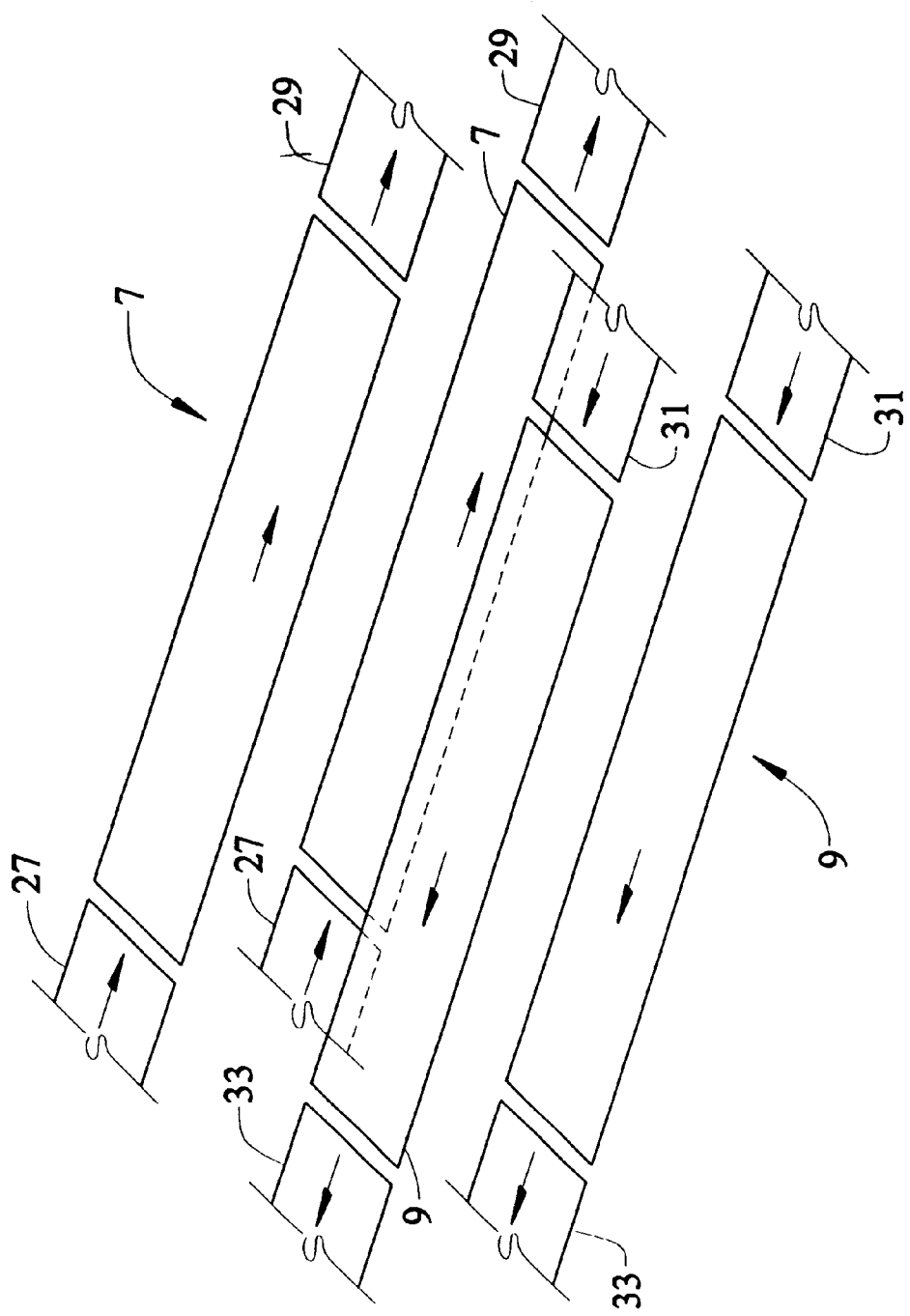
FIG. 9 is a schematic view of a vertically stacked side-by-side conveyor system.

With reference now to FIGS. 4 and 5, an exemplary support arrangement is depicted for the carry conveyor 7 and return conveyor 9. The conveyors 7 and 9 are supported by outer support columns 71 and inner support columns 73. A cross beam 75 extends between the columns 71, the beam further supported by the inner support columns 73. Disposed on the cross beam 75 are outer idler rolls supports 77 and 78 with a center support designated by the reference numeral 79. These supports carry two longitudinally arranged series of idler rolls, 81 and 83, for each of the carry conveyor 7 and the return conveyor 9, respectively. The idler rolls 81 are spaced apart from adjacent rolls 81 and are staggered with respect to the idler rolls 83.

FIG. 5 more clearly shows the staggered arrangement of the idler rolls. The center support 79 has a notch 85 for each idler roll with the outer support 78 having notches 87 for the idler rolls 83, the other outer support 77 having notches 89 to support the idler rolls 81. An exemplary spacing between the rolls 81 would be about 42 inches with the stagger between rolls being roughly one-half of that or 21 inches. The idler roll arrangement depicted in FIGS. 4 and 5 provides both baggage support and a reduction of the vibration of the belt/idler roll combinations, particularly at belt speeds in excess of 2,100 feet per minute. By having two series of staggered idler rolls, the rolls are shorter than rolls used to support the entire belt width. Further, the staggered spacing of the rolls breaks up harmonics of out of round rolls and lessens or eliminates belt sag between the rolls.

It should also be understood that the support arrangement shown in FIG. 4 is exemplary and other configurations and/or numbers of support columns or the like could be utilized to achieve the spaced and staggered idler roll arrangement. Similarly, the supports for the other features of the invention, e.g., the drive assembly 50, the twist assemblies 35 and 38, etc., can be any type. A further description of the various supports is not believed to be necessary for understanding of the invention.

Figure 6:
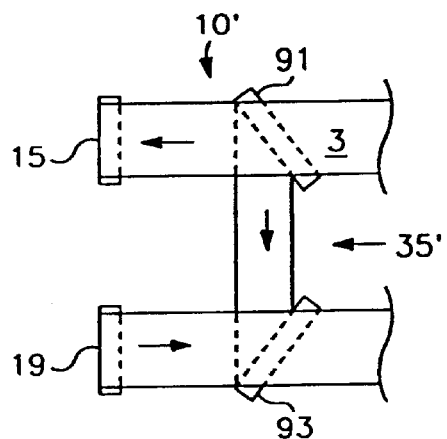
FIG. 6 is a partial schematic view of a second embodiment of the inventive conveyor system showing tapered rolls for belt twisting.
Figure 7:
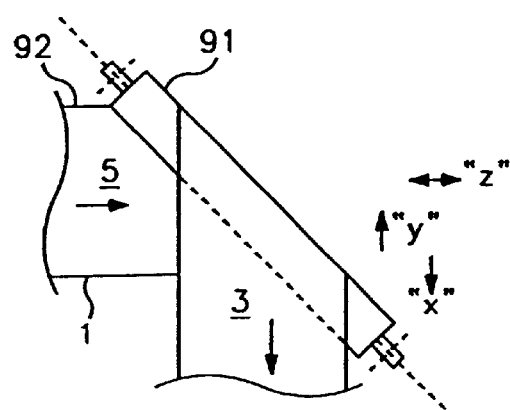
FIG. 7 is an enlarged plan view of one of the tapered rolls shown in FIG. 5.

An alternative twisting assembly arrangement is disclosed in FIGS. 6 and 7 as reference numeral 35'. In this embodiment, tapered rolls 91 and 93 are used to twist the endless belt 1 from the exit end 15 so that it can be directed to the entrance end 19 of the return conveyor 9. When using the tapered rolls 91 and 93, the resultant belt pull force exerts a force along the tapered roll center line in the "Y" direction. The edge 92 of the belt 1 that engages the tapered roll 91 is subjected to two influences. The first influence is to lie flat thus causing the belt 1 to twist or bend laterally. As a result, the belt 1 is thrown over to the high side of the roll or in the "X" direction. As the roll taper or "crown" amount is based on the resultant force vector diagram and its angular location relative to the center of rotation, the belt 1 is pulled in the "X" direction by its reaction to the taper and in the "Y" direction by the resultant's component that is parallel with the center of rotation. To compensate for actual conditions, the bearings supporting the roll should be made adjustable in the "Z" directions to get the center line of rotation in the most favorable attitude consistent with the actual tensions in and out of the roll.

Referring again to FIG. 6, the belt 1 makes a clockwise wrap around tapered roll 91 and continues with an additional clockwise wrap around tapered roll 93 so that the baggage carrying surface 3 is maintained in the upward direction for the return conveyor 9. These tapered rolls also negate the vector force tension from the entry surface of the roll to the exit surface of the roll as is present in the vertically aligned rolls.

Figure 8:
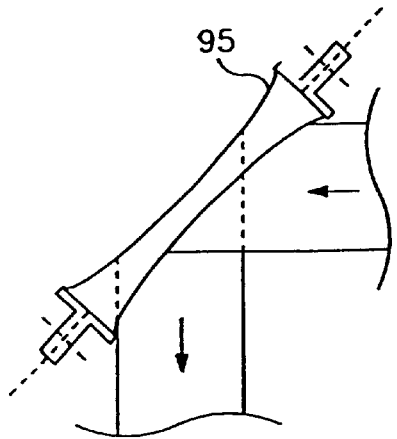
FIG. 8 is a plan view of a belt and an hour glass-shaped roll for belt twisting.

In yet a further embodiment, FIG. 8 depicts an hourglass-shaped roll which can be used in substitution for the tapered rolls 91. With the hourglass shape having a taper from each end to the center, the roll 95 can be bi-directional as opposed to the uni-directional use of either of the tapered rolls 91 and 93.

The means or devices for adjusting the vertical displacement of the vertically aligned twisting rolls and the horizontal displacement of the horizontally aligned tapered or hourglass shaped rolls can be any known devices capable of tilting or moving the rolls in one or more directions. The appropriate controls can also be utilized to permit setting of pre-determined parameters or adjustment of the roll orientations during conveyor operation.

The idler roll arrangement depicted in FIGS. 4 and 5 as a support for the conveyors 7 and 9 is a preferred arrangement and other arrangements for the rolls including their support structure are within the scope of the invention.

In addition, determinations of the tapered roll dimensions, hourglass roll dimensions or the parameters for twisting of the endless belt 1 are deemed to be within the skill of the art. An example of a catenary twist length would be one foot of span for each inch of belt width.

As such, an invention has been disclosed in terms of preferred embodiments thereof which fulfill each and every one of the objects of the present invention as set forth above and provides a new and improved side-by-side belt conveyor system and its method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A side-by-side conveyor system comprising:
   a) an endless belt having a baggage carrying surface and an opposing friction surface;
   b) a first conveyor support for the endless belt having a first entrance end and a first exit end that form therebetween a first baggage travel path;
   c) a second conveyor support for the endless belt having a second entrance end and a second exit end that form therebetween a second baggage travel path;
   d) a first conveyor twist assembly directing the endless belt at the first exit end to the second entrance end and a second conveyor twist assembly directing the endless belt at the second exit end to the first entrance end, each conveyor twist assembly including at least two twist rolls positioned to twist the endless belt so that the baggage carrying surface facing upwardly when traveling in one direction along the first baggage travel path remains upward when traveling in an opposite direction along the second baggage travel path, wherein each of the twist rolls of at least one conveyor twist assembly has an axis of rotation which is generally horizontally oriented, and at least one of the horizontally inclined twist rolls is tapered in shape; and
   e) at least one conveyor drive assembly for driving the endless belt alone each baggage travel path.

2. The system of claim 1, wherein at least one of the horizontally aligned twist rolls has an hour glass shape longitudinally.

3. The system of claim 1, wherein each of the twist rolls of at least one conveyor twist assembly has an axis of rotation which is vertically oriented, and the conveyor system further includes at least one substantially vertically aligned stabilizer roll pair positioned between the vertically oriented twist rolls, the endless belt threading between the stabilizer roll pair, the stabilizer roll pair being offset from a vertical axis to stiffen the endless belt during travel between the vertically oriented twist rolls.

4. The system of claim 3, wherein the stabilizer roll pair is moveable along the vertical axis to bend the vertically aligned belt as it travels between the vertically oriented twist rolls.

5. The system of claim 1, further comprising a set of staggered idle rolls disposed beneath the endless belt and along at least one of the first and second baggage travel paths, the set of staggered idler rolls comprising a first row of rolls spaced apart longitudinally and beneath a portion of the endless belt and a second row of rolls spaced apart longitudinally and beneath a remaining portion of the endless belt, the first set of rolls staggered laterally with respect to the second set of rolls.

6. The system of claim 1, further comprising a first feed conveyor with a conveyor exit end adjacent to the first entrance end and a first take away conveyor with a conveyor entrance end adjacent to the first exit end and a second feed conveyor with a second conveyor exit end adjacent to the second entrance end and a second take away conveyor with a second conveyor entrance end adjacent to the second exit end.

7. The system of claim 6, wherein the first baggage travel path and the second baggage travel path are at substantially the same elevation.

8. The system of claim 1, further comprising a plurality of endless belts, first conveyor supports, second conveyor supports, first conveyor twist assemblies, second conveyor twist assemblies and conveyor drive assemblies, wherein the plurality of first conveyor supports are vertically arranged and the plurality of second conveyor supports are vertically arranged to form a stacked side-by-side conveyor system comprised of a plurality of vertically arranged side-by-side conveyor systems.

9. The system of claim 1, further comprising a first feed conveyor with a conveyor exit end adjacent to each of the first entrance ends of the plurality of side-by-side conveyor systems, and a first take away conveyor with a conveyor entrance end adjacent to each of the first exit ends and a second feed conveyor with a second conveyor exit end adjacent to each of the second entrance ends and a second take away conveyor with a second conveyor entrance end adjacent to each of the second exit ends.

10. The system of claim 1, wherein the first baggage travel path and the second baggage travel path are at substantially the same elevation.

11. The system of claim 1, wherein at least one of the horizontally aligned twist roll is moveable in a horizontal plane.

12. A side-by-side conveyor system comprising:
  a) an endless belt having a baggage carrying surface and an opposing friction surface;
  b) a first conveyor support for the endless belt having a first entrance end and a first exit end that form therebetween a first baggage travel path;
  c) a second conveyor support for the endless belt having a second entrance end and a second exit end that form therebetween a second baggage travel path;
  d) a first conveyor twist assembly directing the endless belt at the first exit end to the second entrance end and a second conveyor twist assembly directing the endless belt at the second exit end to the first entrance end, each conveyor twist assembly including at least two twist rolls positioned to twist the endless belt so that the baggage carrying surface facing upwardly when traveling in one direction along the first baggage travel path remains upward when traveling in an opposite direction along the second baggage travel path, wherein each of the twist rolls of at least one conveyor twist assembly has an axis of rotation which is generally horizontally oriented, and at least one of the horizontally aligned twist rolls is moveable in a horizontal plane; and
  e) at least one conveyor drive assembly for driving the endless belt along each baggage travel path.

13. The system of claim 12, wherein each of the twist rolls of at least one conveyor twist assembly has an axis of rotation which is vertically oriented, and the conveyor system further includes at least one substantially vertically aligned stabilizer roll pair positioned between the vertically oriented twist rolls, the endless belt threading between the stabilizer roll pair, the stabilizer roll pair being offset from a vertical axis to stiffen the endless belt during travel between the vertically oriented twist rolls.

14. The system of claim 13, wherein the stabilizer roll pair is moveable along the vertical axis to bend the vertically aligned belt as it travels between the vertically oriented twist rolls.

15. The system of claim 12, further comprising a set of staggered idle rolls disposed beneath the endless belt and along at least one of the first and second baggage travel paths, the set of staggered idler rolls comprising a first row of rolls spaced apart longitudinally and beneath a portion of the endless belt and a second row of rolls spaced apart longitudinally and beneath a remaining portion of the endless belt, the first set of rolls staggered laterally with respect to the second set of rolls.

16. The system of claim 12, further comprising a first feed conveyor with a conveyor exit end adjacent to the first entrance end and a first take away conveyor with a conveyor entrance end adjacent to the first exit end and a second feed conveyor with a second conveyor exit end adjacent to the second entrance end and a second take away conveyor with a second conveyor entrance end adjacent to the second exit end.

17. The system of claim 16, wherein the first baggage travel path and the second baggage travel path are at substantially the same elevation.

18. The system of claim 12, further comprising a plurality of endless belts, first conveyor supports, second conveyor supports, first conveyor twist assemblies, second conveyor twist assemblies and conveyor drive assemblies, wherein the plurality of first conveyor supports are vertically arranged and the plurality of second conveyor supports are vertically arranged to form a stacked side-by-side conveyor system comprised of a plurality of vertically arranged side-by-side conveyor systems.

19. The system of claim 12, further comprising a first feed conveyor with a conveyor exit end adjacent to each of the first entrance ends of the plurality of side-by-side conveyor systems, and a first take away conveyor with a conveyor entrance end adjacent to each of the first exit ends and a second feed conveyor with a second conveyor exit end adjacent to each of the second entrance ends and a second take away conveyor with a second conveyor entrance end adjacent to each of the second exit ends.

20. The system of claim 12, wherein the first baggage travel path and the second baggage travel path are at substantially the same elevation.

* * * * *